(12) United States Patent
Liu

(10) Patent No.: US 11,292,540 B2
(45) Date of Patent: Apr. 5, 2022

(54) SCOOTER

(71) Applicant: X.L.T INTERNATIONAL ELECTRONICS CO., LTD, Shenzhen (CN)

(72) Inventor: Antang Liu, Shenzhen (CN)

(73) Assignee: X.L.T INTERNATIONAL ELECTRONICS CO., LTD, Shenzhen (CN)

( * ) Notice: Subject to any disclaimer, the term of this patent is extended or adjusted under 35 U.S.C. 154(b) by 30 days.

(21) Appl. No.: 17/076,737

(22) Filed: Oct. 21, 2020

(65) Prior Publication Data
US 2021/0323626 A1 Oct. 21, 2021

Related U.S. Application Data

(63) Continuation of application No. PCT/CN2020/085214, filed on Apr. 16, 2020.

(30) Foreign Application Priority Data

Mar. 16, 2019 (CN) .......................... 201920344459.1
Apr. 15, 2020 (CN) .......................... 202020561449.6

(51) Int. Cl.
*B62J 11/19* (2020.01)
*B62K 21/02* (2006.01)
(Continued)

(52) U.S. Cl.
CPC ............... *B62J 11/19* (2020.02); *B62K 3/002* (2013.01); *B62K 11/14* (2013.01); *B62K 19/18* (2013.01);
(Continued)

(58) Field of Classification Search
CPC ............................. B62J 11/19; B62K 2202/00
(Continued)

(56) References Cited

U.S. PATENT DOCUMENTS 7,566,065 B2 * 7/2009 Fukui ..................... B62K 19/32
280/281.1
7,891,687 B2 * 2/2011 Schmider ............... B62K 19/30
280/281.1
(Continued)

FOREIGN PATENT DOCUMENTS

CN 206427198 U 8/2017
CN 207129079 U 3/2018
(Continued)

*Primary Examiner* — Kevin Hurley
*Assistant Examiner* — Hosam Shabara
(74) *Attorney, Agent, or Firm* — Andrew C. Cheng

(57) ABSTRACT

The present disclosure provides a scooter including a wiring structure. The wiring structure is fixedly connected to the handle assembly, the frame assembly, and the front wheel assembly, respectively. The second tubular member sleeves a periphery of the first tubular member and an axis of the first tubular member coincides with an axis of the second tubular member. A first opening and a second opening are respectively provided on the first tubular member and the second tubular member, and the first opening is opposite to the second opening. One end of the third tubular member is fixedly connected to the second tubular member along the second opening. When the first tubular member is rotated relative to the second tubular member there is a gap. The scooter of the present disclosure has the advantage of smoothly guiding the wires without damaging the wires.

15 Claims, 13 Drawing Sheets

(51) Int. Cl.
*B62K 25/04* (2006.01)
*B62K 3/00* (2006.01)
*B62K 11/14* (2006.01)
*B62K 19/18* (2006.01)

(52) U.S. Cl.
CPC .............. *B62K 21/02* (2013.01); *B62K 25/04*
(2013.01); *B62K 2202/00* (2013.01)

(58) Field of Classification Search
USPC ........................................................ 180/181
See application file for complete search history.

(56) References Cited

U.S. PATENT DOCUMENTS

| | | | |
|---|---|---|---|
| 2011/0121538 A1* | 5/2011 | Giroux | B62K 23/06 |
| | | | 280/280 |
| 2018/0273132 A1 | 9/2018 | Huang | |
| 2021/0354776 A1* | 11/2021 | Pelot | B62K 3/02 |

FOREIGN PATENT DOCUMENTS

| | | | | | |
|---|---|---|---|---|---|
| CN | 108528605 A | | 9/2018 | | |
| CN | 207843157 U | * | 9/2018 | ............. | B62J 11/19 |
| CN | 208021647 U | | 10/2018 | | |
| CN | 109018153 A | | 12/2018 | | |
| CN | 209700844 U | | 11/2019 | | |
| CN | 209818611 U | | 12/2019 | | |
| CN | 112124464 A | * | 12/2020 | | |
| EP | 3450294 B1 | * | 3/2020 | ............. | B62K 21/16 |

\* cited by examiner

123

16

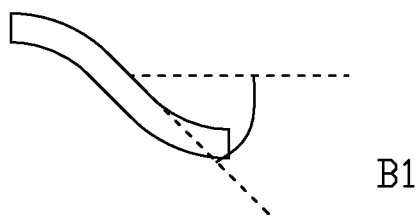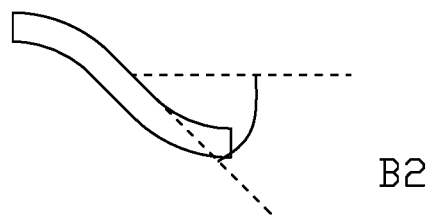
Fig. 6E　　　　　　　　　Fig. 6F
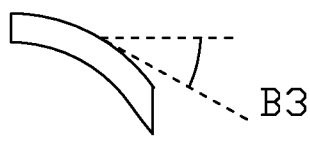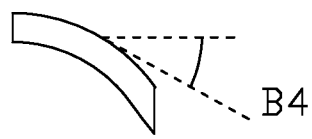
Fig. 6G　　　　　　　　　Fig. 6H

SCOOTER

TECHNICAL FIELD

The present disclosure relates to the field of scooter technology, in particular to a scooter.

BACKGROUND

With development of the times, people have begun to choose a healthier travel mode, i.e., scooters. In order to reduce damage to the wires, people connect the wires to the surface of the scooter and bind them together, or connect the wires to the handle through a connecting rod.

The above two modes may cause the wires to be scratched and damaged by external objects, or cause the wires to be worn in the connecting rod, neither of which can better protect the wires.

Therefore, how to solve the problem that the wires of the scooter can be smoothly guided without damaging the same becomes the focus.

SUMMARY

To overcome the above technical problem, the present disclosure provides a scooter.

The solution of the present disclosure solving the technical problem is to provide a scooter, which includes a handle assembly, a frame assembly, a front wheel assembly and a wiring structure. The wiring structure is fixedly connected to the handle assembly, the frame assembly, and the front wheel assembly, respectively. The wiring structure includes a first tubular member, a second tubular member, and a third tubular member. The second tubular member sleeves a periphery of the first tubular member and an axis of the first tubular member coincides with an axis of the second tubular member. A first opening and a second opening are respectively provided on the first tubular member and the second tubular member, and the first opening is opposite to the second opening. One end of the third tubular member is fixedly connected to the second tubular member along the second opening. When the first tubular member is rotated relative to the second tubular member, there is a gap between the first opening and the second opening.

Compared with the prior art, the scooter of the present disclosure has the following advantages:

1. The wiring structure of the scooter provided by the disclosure facilitates the passage of wires (such as conductive wires and brake wires) inside of the tubular member and connecting with various components, without passing outside the tubular member, which protects the wires from being scratched and damaged by external objects, and prolongs the service life of the circuit of the scooter. In addition, there is the gap between the first opening and the second opening when the first tubular member is rotated relative to the second tubular member, which can not only ensure that there is enough space for accommodating the wires when the first tubular member is rotated relative to the second tubular member, but also prevent the wires from being "cut" or "damaged due to excessively tight clamping" by misalignment of the first opening and the second opening. Thus, the service life of the circuit of the scooter is further prolonged.

2. A first blocking member and a second blocking member are disposed, and when the first tubular member is rotated relative to the second tubular member, the first blocking member and the second blocking member are mutually restrained to limit a rotation angle of the first tubular member relative to the second tubular member. As a result, the wires will not be "cut" or "damaged due to excessively tight clamping" by misalignment of the first opening and the second opening and thus, and the service life of the circuit of the scooter is further prolonged.

3. A limiting protrusion and limiting stoppers are disposed, the limiting protrusion is provided on the first tubular member and includes a fixed ring and a protrusion, and the limiting toppers are provided at two ends of the notch, which is provided on the second tubular member, in the radial direction of the first tubular member. Thus, when the first tubular member is rotated relative to the second tubular member, the protrusion is blocked by the limiting stoppers so as to limit the rotation angle of the first tubular member relative to the second tubular member. Hence, the structure is simple and relatively high feasibility is achieved.

4. By limiting the diameter of the first opening and the diameter of the second opening, the first opening and the second opening have enough space to accommodate the wires of the scooter and moreover, it can ensure that when the first tubular member is rotated relative to the second tubular member, a distance between the edge of the first opening and the corresponding edge of the second opening is moderate, thereby preventing the wires from being "cut" or "damaged due to excessively tight clamping" by misalignment of the first opening and the second opening.

5. The third tubular member includes a wire-hiding groove and a cover plate, one end of the wire-hiding groove is fixedly connected to the second tubular member along the second opening, one end of the cover plate is detachably adjacent to a connection portion of the wire-hiding groove and the second tubular member, and the other end of the cover plate may be turned over relative to the wire-hiding groove. By such a structure, particular during assembly of the scooter, by turning over the cover plate, it is convenient for the wires of the scooter to pass through the first tubular member, the second tubular member and the third tubular member, thereby achieving the purposes that the wires of the scooter are smoothly guided and the wires of the scooter are accommodated in the tubular members.

6. The third tubular member comprises an adjoining rib and a connecting rib that are fixedly connected in an axial direction of the third tubular member and the connecting rib and/or the adjoining rib are/is fixedly connected with the second tubular member, which strengthens the connection between the third tubular member and the second tubular member, improves the stability of the wiring structure, and is beneficial to the stability of the scooter.

7. The first tubular member can be rotated relative to the second tubular member through bearings provided at two ends of the first tubular member, so that it is convenient for a user to operate and control the scooter by the handle assembly.

BRIEF DESCRIPTION OF THE DRAWINGS

FIG. 6E is a schematic structural plan diagram of a first transition portion of the scooter according to the present disclosure.

FIG. 6F is a schematic structural plan diagram of a first transition section of the scooter according to the present disclosure.

FIG. 6G is a schematic structural plan diagram of a second transition section of the scooter according to the present disclosure.

FIG. 6H is a schematic structural plan diagram of a second transition section of the scooter according to the present disclosure.

DETAILED DESCRIPTION

In order to make the objectives, technical solutions, and advantages of the present disclosure clearer, the present disclosure is further described in detail below with reference to the accompanying drawings and embodiments. It should be understood that the specific embodiments described herein are only used to explain the present disclosure and are not intended to limit the present disclosure.

Figure 1:
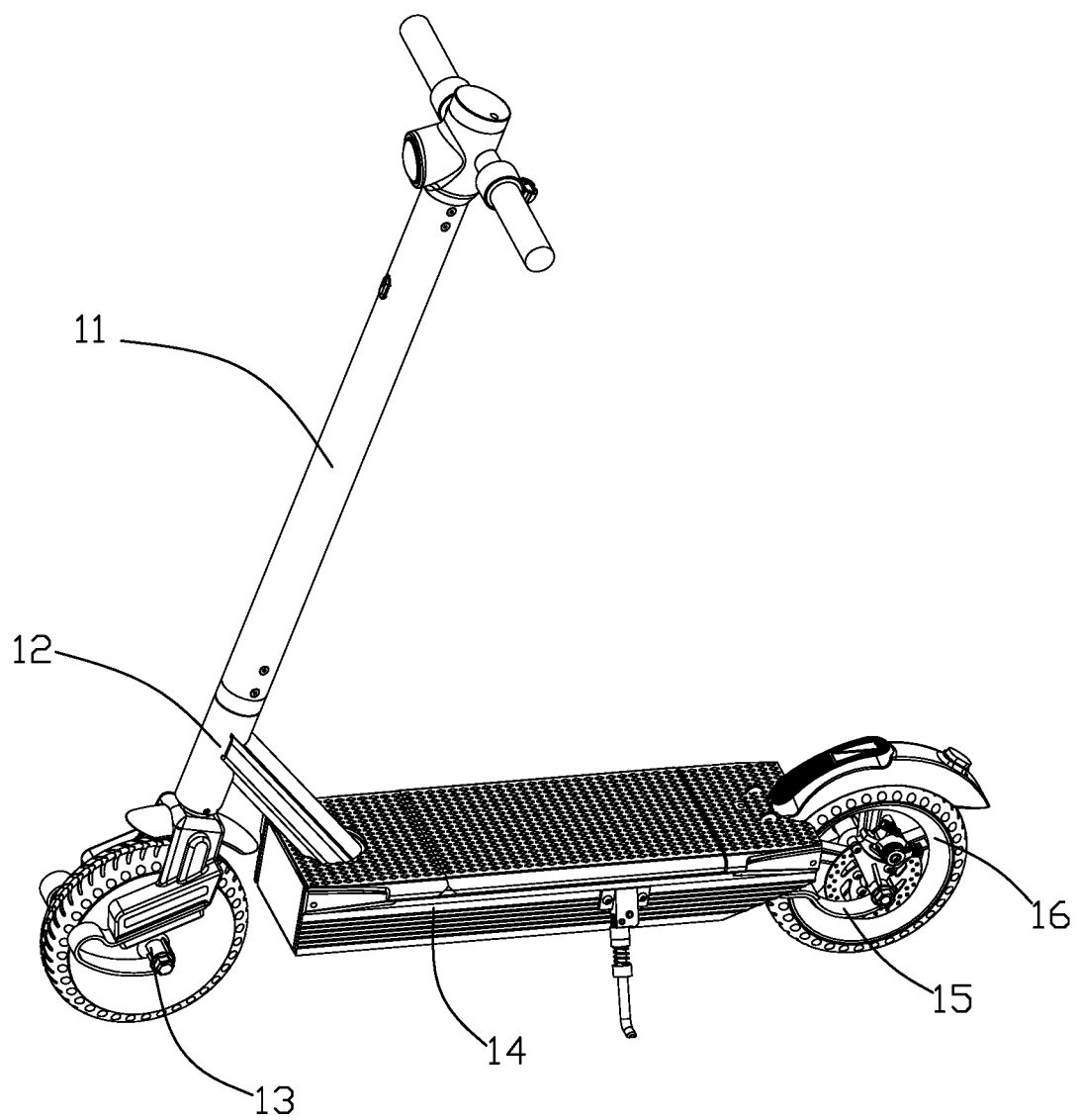
FIG. 1 is a schematic structural perspective diagram of a scooter according to the present disclosure.

Referring to FIG. 1, the present disclosure provides a scooter 10 including a handle assembly 11, a wiring structure 12, a front wheel assembly 13, a frame assembly 14, a vibration damper 15, and a rear wheel assembly 16. The wiring structure 12 is fixedly connected to the handle assembly 11 and the front wheel assembly 13, respectively. One end of the frame assembly 14 is fixedly connected to the wiring structure 12, the other end thereof is connected to one end of the vibration damper 15, and the other end of the vibration damper 15 is connected to the rear wheel assembly 16. In the present disclosure, for convenience of description, the end of the frame assembly 14 near the wiring structure 12 is defined as a front end, and the end of the frame assembly 14 near the rear wheel assembly 16 is defined as a rear end.

The handle assembly 11 is configured to control the traveling direction, traveling speed, lighting, braking and the like of the scooter 10. The wiring structure 12 is configured for the passage of the wires, so as to reduce the passage of the wires on the external surface of the scooter 10 and reduce the possibility of the wires being damaged. The frame assembly 14 is provided therein with a control circuit and a power supply, and may be trodden by a user during travel. The vibration damper 15 is configured to attenuate the vibration of the scooter 10.

Figure 2:
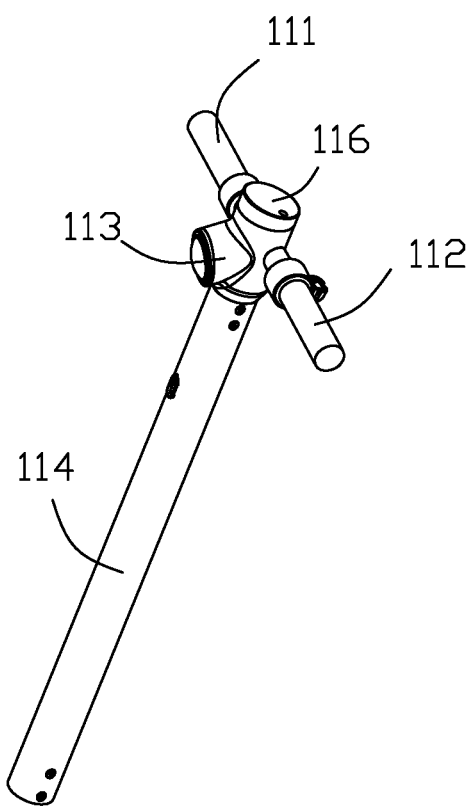
FIG. 2 is a schematic structural perspective diagram of a handle assembly of a scooter according to the present disclosure.

Referring to FIG. 2, the handle assembly 11 includes a first handle 111, a second handle 112, a body member 113, and a connecting rod 114. The first handle 111 and the second handle 112 are connected to opposite sides of the body member 113, respectively. One end of the connecting rod 114 is connected to the body member 113 in a direction perpendicular to the first handle 111 or the second handle 112, and the other end thereof is connected to the front wheel assembly 13. After the first handle 111, the second handle 112, and the connecting rod 114 are all connected to the body member 113, the handle assembly 11 is in a "T" shape as a whole.

In this embodiment, the handle assembly 11 further includes a handbrake assembly (not shown) that is connected to the first handle 111 or the second handle 112 for applying a force to the front wheel assembly 13 or the rear wheel assembly 16 to achieve braking. The handle assembly 11 further includes a control assembly 116 that is electrically connected to the frame assembly 14 and the front wheel assembly 13 and is configured to control power on, stop or travel of the scooter 10. Preferably, the control assembly 116 is received in the body member 113 and is partially exposed. The user may control the start or stop of the scooter 10 by touching or pressing the control assembly 116.

Figure 3A:
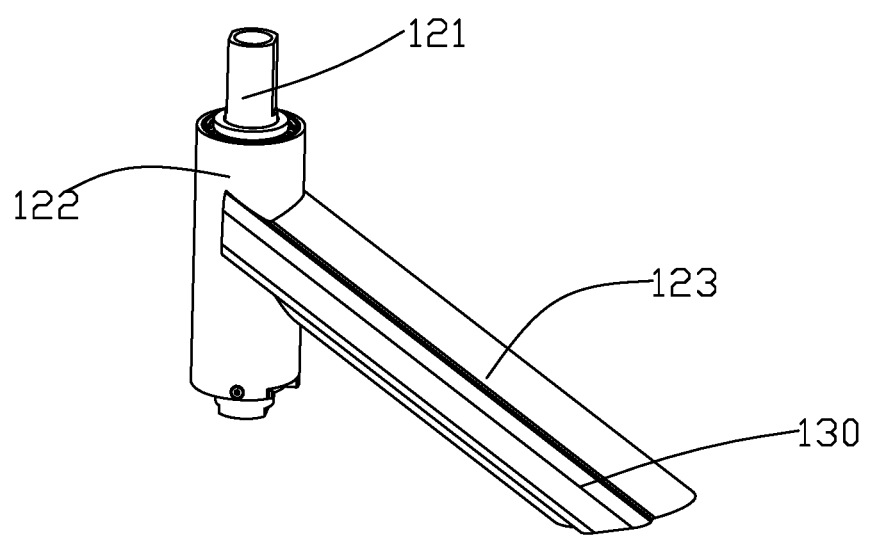
FIG. 3A is a schematic structural perspective diagram of a wiring structure of a scooter according to the present disclosure.
Figure 3B:
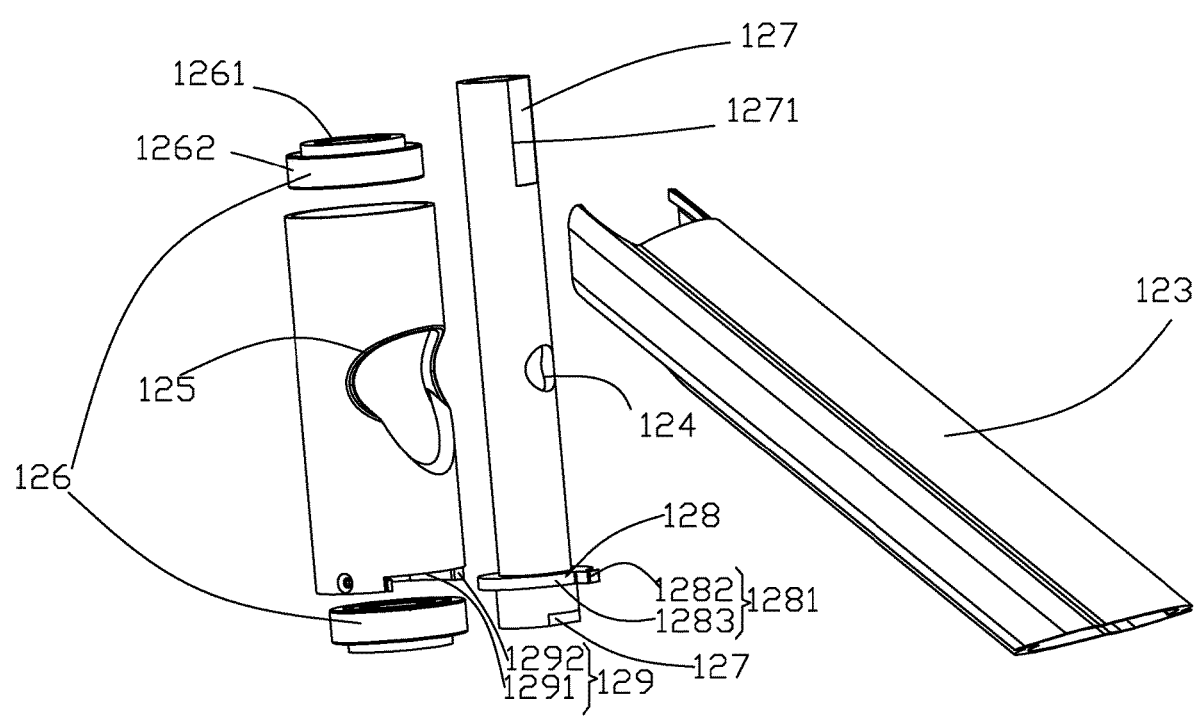
FIG. 3B is a schematic structural exploded diagram of the wiring structure of the scooter according to the present disclosure.
Figure 3C:
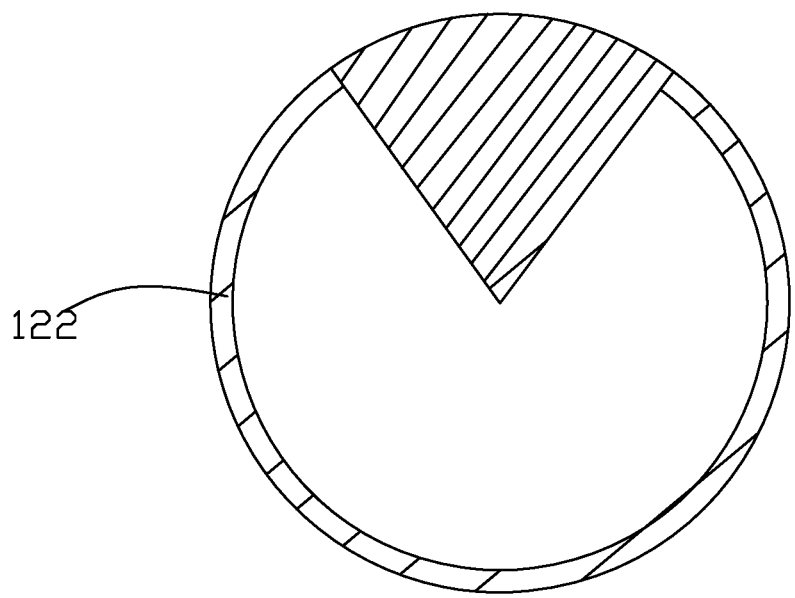
FIG. 3C shows a first sector region formed by the second opening and the circle center and a second sector region formed by the first opening and the circle center of the scooter according to the present disclosure.

Referring to FIGS. 3A, 3B and 3C, the wiring structure 12 is connected to the handle assembly 11, the front wheel assembly 13, and the frame assembly 14. Specifically, the wiring structure 12 includes a first tubular member 121, a second tubular member 122, and a third tubular member 123. The first tubular member 121 is sleeved in the second tubular member 122. The first tubular member 121 and the second tubular member 122 are respectively provided with a first opening 124 and a second opening 125, and the first opening 124 is opposite to the second opening 125. Preferably, the size of the first opening 124 is less than the size of the second opening. The third tubular member 123 is fixedly connected to the second tubular member 122 along the edge of the second opening 125. In the radial section of the second tubular member 122 corresponding to the first opening 124 (preferably, the radial section is formed along the maximum width of the second opening 125, and the center of the first opening 124 corresponds to the maximum width of the second opening 125), the edge and the circle center of the second opening 125 form a second sector region A, the edge and the circle center of the first opening 124 form a first sector region B, and the first sector region B can only rotate in the second sector region A.

In some other embodiments, the size of the first opening 124 is or greater than or equal to the size of the second opening 125.

Optionally, the first opening 124 has a diameter of 10-20 mm and the second opening 125 has a diameter of 10-20 mm. Preferably, the first opening 124 has a diameter of 15 mm and the second opening 125 has a diameter of 14 mm. By limiting the diameter of the first opening 124 and the diameter of the second opening 125, the first opening 124 and the second opening 125 have enough space to accommodate the wires of the scooter and moreover, and moreover it can ensure that when the first tubular member 121 is rotated relative to the second tubular member 122, a distance between the edge of the first opening 124 and the corresponding edge of the second opening 125 is moderate, thereby preventing the wires from being "cut" or "damaged due to excessively tight clamping" by misalignment of the first opening 124 and the second opening 125.

Specifically, as shown in FIG. 3C, the radial section is a plane perpendicular to the axis and passing through both the first opening 124 and the second opening 125. The intersection point of the plane and the axis is the circle center. Two intersection points of the plane and the edge of the first opening 124 are two first intersections. Two intersection points of the plane and the edge of the second opening 125 are two second intersections. The circle center and the two first intersections form the second sector region A. The circle center and the two second intersections form the first sector region B. The first sector region B can only rotate in the second sector region A when the first tubular member 121 is rotated relative to the second tubular member 122; that is, no matter how the first tubular member 121 rotates, the first opening 124 does not move out of the second sector region A. Therefore, when the first tubular member 121 is rotated relative to the second tubular member 122, the wires passing through the first opening 124 and the second opening 125 would not be "cut" due to the misalignment of the first opening 124 and the second opening 125.

It can be understood that the direction of the axis of the first tubular member 121 coincides with the direction of the axis of the second tubular member 122. Preferably, the axis of the first tubular member 121 coincides with the axis of the second tubular member 122.

Further referring to FIG. 3B, the wiring structure 12 further includes two bearings 126. The bearing 126 includes an inner ring 1261 and an outer ring 1262. The inner rings 1261 are sleeved at both ends of the first tubular member 121 and fixedly connected to the first tubular member 121. The outer rings 1262 are sleeved in the second tubular member 122 and fixedly connected to the second tubular member 122. The first tubular member 121 is rotatable relative to the second tubular member 122 through the bearings 126. Positioning members 127 are provided at both ends of the first tubular member 121 so as to connect with the handle assembly 11 and the front wheel assembly 13. Specifically, both ends of the first tubular member 121 are provided as positioning posts 1271, including but not limited to this. Alternatively, both ends of the first tubular member 121 may be provided as the positioning members 127, such as teeth and keyways, provided that the first tubular member 121 can be connected to the handle assembly 11 and the front wheel assembly 13. One end of the first tubular member 121 is fixedly connected to the connecting rod 114, the other end thereof is connected to the front wheel assembly 13. The third tubular member 123 is connected to the frame assembly 14.

Further referring to FIG. 3B, as an embodiment, in order to limit the rotation angle of the first tubular member 121 relative to the second tubular member 122, the wiring structure 12 further includes a first blocking member 128 and a second blocking member 129. The first blocking member 128 is fixedly arranged on the first tubular member 121, and the second blocking member 129 is fixedly arranged on the second tubular member 122. When the first tubular member 121 is rotated relative to the second tubular member 122, the first blocking member 128 and the second blocking member 129 are mutually restrained so that the rotation angle of the first tubular member 121 relative to the second tubular member 122 is less than or equal to A.

There is a gap between the first opening 124 and the second opening 125. The gap is a space which is reserved between the leftmost edge of the first opening 124 and the rightmost edge of the second opening 125 and allows the wires to pass through smoothly without bending, when the first tubular member 121 is rotated relative to the second tubular member 122, or the gap is a space which is reserved between the rightmost edge of the first opening 124 and the leftmost edge of the second opening 125 and allows the wires to pass through smoothly without bending, when the first tubular member 121 is rotated relative to the second tubular member 122.

The first blocking member 128 and the second blocking member 129 are disposed, and when the first tubular member 121 is rotated relative to the second tubular member 122, the first blocking member 128 and the second blocking member 129 are mutually restrained to limit the rotation angle of the first tubular member 121 relative to the second tubular member 122. As a result, the wires will not be "cut" or "damaged due to excessively tight clamping" by misalignment of the first opening 124 and the second opening 125 and thus, the service life of the circuit of the scooter is further prolonged. In addition, there is the gap between the first opening 124 and the second opening 125 when the first tubular member 121 is rotated relative to the second tubular member 122, which can not only ensure that there is enough space for accommodating the wires when the first tubular member 121 is rotated relative to the second tubular member 122, but also prevent the wires from being "cut" or "damaged due to excessively tight clamping" by misalignment of the first opening 124 and the second opening 125. Thus, the service life of the circuit of the scooter is further prolonged.

Optionally, the gas has a size of 5-20 mm. Preferably, the gas has a size of 5 mm.

The first blocking member 128 and the second blocking member 129 may be a combination of a post and a hole or a combination of posts, provided that the first blocking member 128 and the second blocking member 129 form a restriction so that the first tubular member 121 cannot continue to rotate after rotating a certain angle relative to the second tubular member 122 in one direction. Specifically, the first blocking member 128 is a limiting protrusion 1281 including a fixed ring 1282 and a protrusion 1283. The protrusion 1283 and the outer rim of the fixed ring 1282 are fixedly connected. The fixed ring 1282 is fixedly sleeved on the first tubular member 121. The second blocking member 129 is a notch 1291 provided on the second tubular member 122 and limiting stoppers 1292. The limiting stoppers 1292 are provided at both ends of the notch 1291 in the radial direction of the first tubular member 121. The protrusion 1283 is located in the notch 1291 and between the limiting stoppers 1292. When the first tubular member 121 is rotated relative to the second tubular member 122, the protrusion 1283 may be blocked by the limiting stopper 1292 to limit the rotation angle of the protrusion 1283 to be less than or equal to A. Preferably, the value of the angle A is 90-135°. The angle A within this angular range does not affect the normal driving of the user and can ensure safety. It can be understood that the limiting stoppers 1292 may be omitted, and in this case, the limiting protrusion 1281 and the notch 1291 form a restriction at both ends of the first tubular member 121 in the radial direction.

Referring to FIG. 3A, in order to increase the connection strength between the second tubular member 122 and the third tubular member 123, the third tubular member 123 includes a connecting rib 130, which is disposed in the axial direction of the third tubular member 123 and is fixedly connected to the second tubular member 122 and the third tubular member 123. After fixing by the connecting rib 130, the connection of the second tubular member 122 and the third tubular member 123 at the second opening 125 is more stable.

It can be understood that the connecting rib 130 may be a solid metal which is welded to the second tubular member 122 and the third tubular member 123 in the direction of the axis of the third tubular member 123, or may be a hollow metal, including but not limited to this, provided that the connecting rib can strengthen the connection of the second tubular member 122 and the third tubular member 123.

Figure 3D:
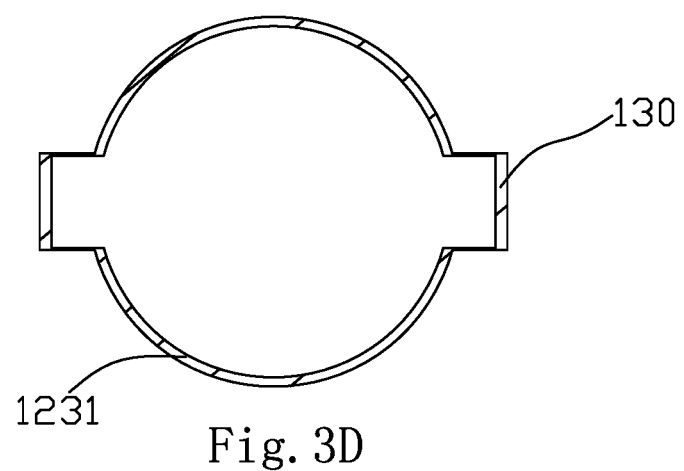
FIG. 3D is a schematic structural sectional diagram of a third tubular member of the scooter according to the present disclosure.

Referring to FIGS. 3A, 3B and 3D together, in the present disclosure, the connecting rib 130 is preferably a hollow structure. The third tubular member 123 further includes an adjoining rib 1231. The connecting rib 130 is connected to the adjoining rib 1231 to form the third tubular member 123 and a third opening (not labeled). The size of the third opening is greater than or equal to the size of the second opening 125. The connecting rib 130 and the adjoining rib 1231 are fixedly connected in the axial direction of the third tubular member 123, and the connecting rib 130 and/or the adjoining rib 1231 are/is also fixedly connected to the second tubular member 122. Because the connecting rib 130 is a hollow structure, that is, the internal space in the radial direction of the third tubular member 123 is increased, so that the wires may rotate to a greater degree in the third tubular member 123 without being blocked, which is convenient for further protection to the wires.

It can be understood that, in the present disclosure, the sizes of the first opening 124, the second opening 125, and the third opening refer to the sizes in a direction perpendicular to the direction of the axis of the first tubular member 121, including but not limited to this. They may be the sizes in other directions, and are specifically set according to actual needs.

Preferably, the number of each of the connecting ribs 130 and the adjoining ribs 1231 is two. The third tubular member 123 is formed by alternately and sequentially connecting the connecting ribs 130 and the adjoining ribs 1231. The distance between the two connecting ribs 130 is defined as k, and the maximum width of the second opening 125 is n, with n: k=(1.1-1.5), further preferably n: k=(1.1-1.3). In this way, during turning, a space for turning of the wires is relatively large, and it is not easy for the wires to scratch the inner wall of the third tubular member 123.

Figure 4A:
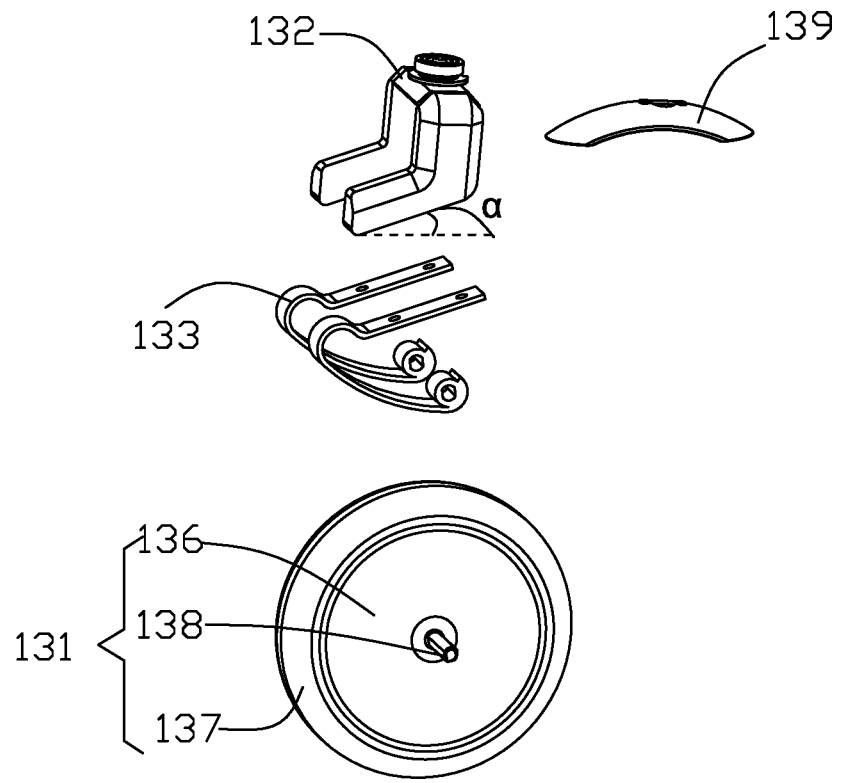
FIG. 4A is a schematic structural exploded diagram of a front wheel assembly of the scooter according to the present disclosure.
Figure 4B:
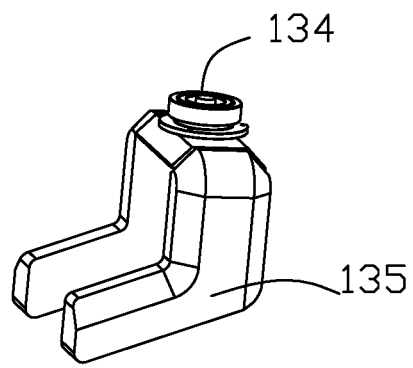
FIG. 4B is a schematic structural perspective diagram of a front fork of the scooter according to the present disclosure.

Referring to FIGS. 4A and 4B, the front wheel assembly 13 includes a front wheel set 131, a front fork 132, and a vibration damping assembly 133. One end of the front fork 132 is connected to the wiring structure 12. The vibration damping assembly 133 is disposed between the front fork 132 and the front wheel set 131 to attenuate the vibration generated by the front wheel set 131 during travel.

Specifically, the front fork 132 includes a front fork shaft joint 134 and a vibration damping connection portion 135 connected to the front fork shaft joint 134. The vibration damping connection portion 135 is configured to connect the vibration damping assembly 133 and the front fork shaft joint 134. The front fork shaft joint 134 is fixedly connected to one end of the first tubular member 121 of the wiring structure 12, so that the user can drive the front fork 132 to follow the rotation synchronously by rotating the handle assembly 11 and through the wiring structure 12, thereby realizing diversion of the front wheel assembly 13.

The front wheel set 131 includes a hub motor 136, a front tire 137, and a rotary shaft 138. The rotary shaft 138 is also a motor shaft of the hub motor 136. The hub motor 136 is disposed in the front tire 137. The hub motor 136 is electrically connected to the control assembly 116. The hub motor 136 is controlled by the control assembly 116 to rotate about the rotary shaft 138, so that the hub motor 136 is an outer rotor motor.

The vibration damping assembly 133 is disposed between the front fork 132 and the rotary shaft 138 to elastically connect the front fork 132 and the rotary shaft 138. If the front wheel assembly 13 is subjected to vibration during travel, vibration reduction can be achieved by elastic buffer.

Preferably, two vibration damping assemblies 133 are provided. The two vibration damping assemblies 133 are respectively disposed on opposite sides of the rotary shaft 138 of the front wheel assembly 13 in the axial direction.

In the present disclosure, the front wheel assembly 13 further includes a front splasher 139, which is disposed between the front fork 132 and the front tire 137 and is connected to the front fork 132 to block debris brought by the front wheel assembly 13 during travel.

It can be understood that the front wheel assembly 13 may not be provided with a hub motor 136. Alternatively, the hub motor 136 may be disposed on the rear wheel assembly 16, i.e., the scooter 10 is driven by a rear wheel.

Figure 5:
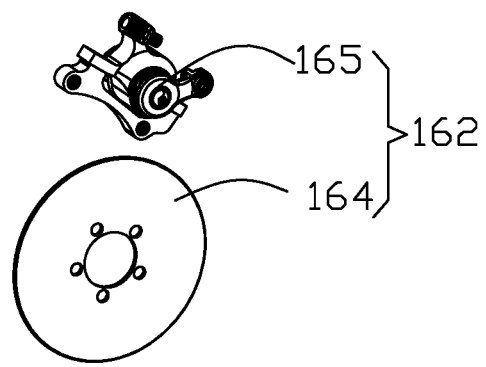
FIG. 5 is a schematic structural exploded diagram of a rear wheel assembly of the scooter according to the present disclosure.
Figure 5:
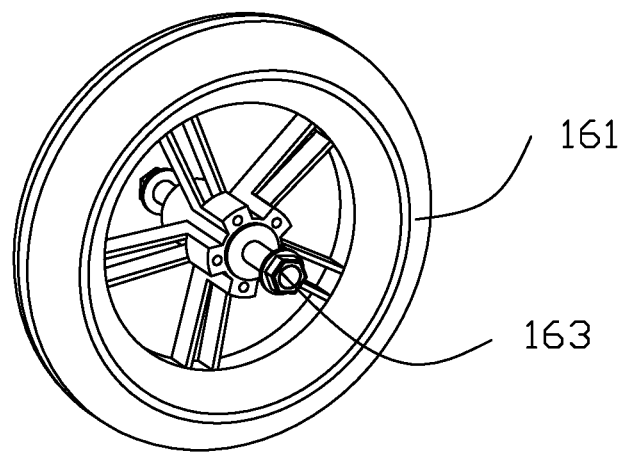

Referring to FIG. 5, the rear wheel assembly 16 includes a rear wheel set 161, a brake assembly 162, and a wheel set rotary shaft 163. The wheel set rotary shaft 163 is rotatably connected to the rear wheel set 161. The brake assembly 162 is connected to the rear wheel set 161 to realize the braking and abrupt stopping of the rear wheel set 161. Specifically, the brake assembly 162 includes a brake pad 164 and a clamping assembly 165. The brake pad 164 and the rear wheel set 161 are fixed by screws. The clamping assembly 165 is connected to the wheel set rotary shaft 163 or the vibration damper 15, and may be elastically displaced relative to the brake pad 164 to clamp the brake pad 164. When braking, a force may be applied to the clamping assembly 165 through the handbrake assembly, so that the clamping assembly 165 clamps the brake pad 164 to apply resistance to the rear wheel set 161 connected to the brake pad 164, thereby realizing the braking and abrupt stopping of the rear wheel set 161. The greater the user's gripping force on the handbrake assembly, the stronger the braking effect, until the rear wheel set 161 completely stops turning. The less the user's gripping force on the handbrake assembly, the weaker the braking effect, until the brake assembly 162 has no effect on the rear wheel set 161.

The vibration damper 15 connects the wheel set rotary shaft 163 of the rear wheel assembly 16 and the frame assembly 14 to attenuate the vibration generated by the rear wheel assembly 16 during travel.

Figure 6A:
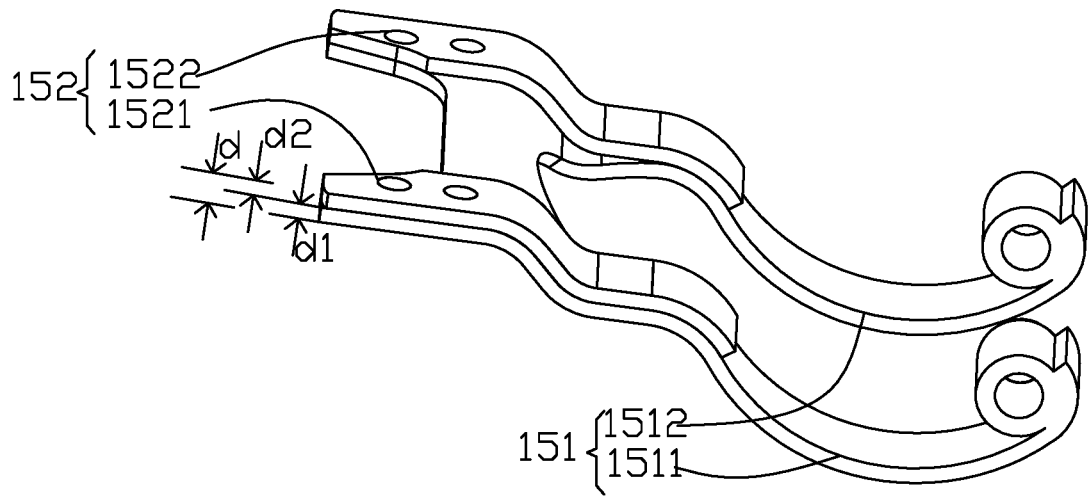
FIG. 6A is a schematic structural perspective diagram of a vibration damper of the scooter according to the present disclosure.

Referring to FIG. 6A, specifically, the vibration damper 15 includes a vibration damping device 151 and a buffering device 152. The buffering device 152 and the vibration damping device 151 are overlapped, and one end of the buffering device 152 is connected to the frame assembly 14.

Preferably, the vibration damping device 151 is generally "U" shaped. The vibration damping device 151 is preferably a leaf spring. The material of the buffering device 152 is preferably metal. The vibration damping device 151 may attenuate vibration well. The buffering device 152 is mainly used to damp and protect the deformed vibration damping device 151, and reduce the breakage and damage to the vibration damping device 151 due to further deformation thereof.

Further referring to FIG. 6A, the buffering device 152 includes a first buffering member 1521 and a second buffering member 1522 having the same structure. The first buffering member 1521 and the second buffering member 1522 are formed integrally or provided separately. The vibration damping device 151 includes first and second vibration damping members 1511 and 1512 arranged symmetrically. Preferably, the first and second vibration damping members 1511 and 1512 are formed integrally. The first buffering member 1521 and the first vibration damping member 1511 are overlapped, and the second buffering member 1522 and the second vibration damping member 1512 are overlapped. The distance between the first vibration damping member 1511 and the second vibration damping member 1512 gradually decreases from an end close to the frame assembly 14 to an end close to the rear wheel assembly 16, and the first buffering member 1521 gradually tapers from an end close to the frame assembly 14 to an end close to the rear wheel assembly 16, which is beneficial to the assembly and disassembly of the vibration damper 15, the frame assembly 14, and the rear wheel assembly 16. As the width of the vibration damping device 151 gradually decreases, the elasticity of the vibration damping device 151 is increased, thus improving the vibration damping effect. Since the structures and functions of the first and second vibration damping members 1511 and 1512 are substantially the same, the structures and functions of the first and second buffering members 1521 and 1522 are substantially the same, only the first vibration damping member 1511 and the first buffering member 1521 are described.

Figure 6B:
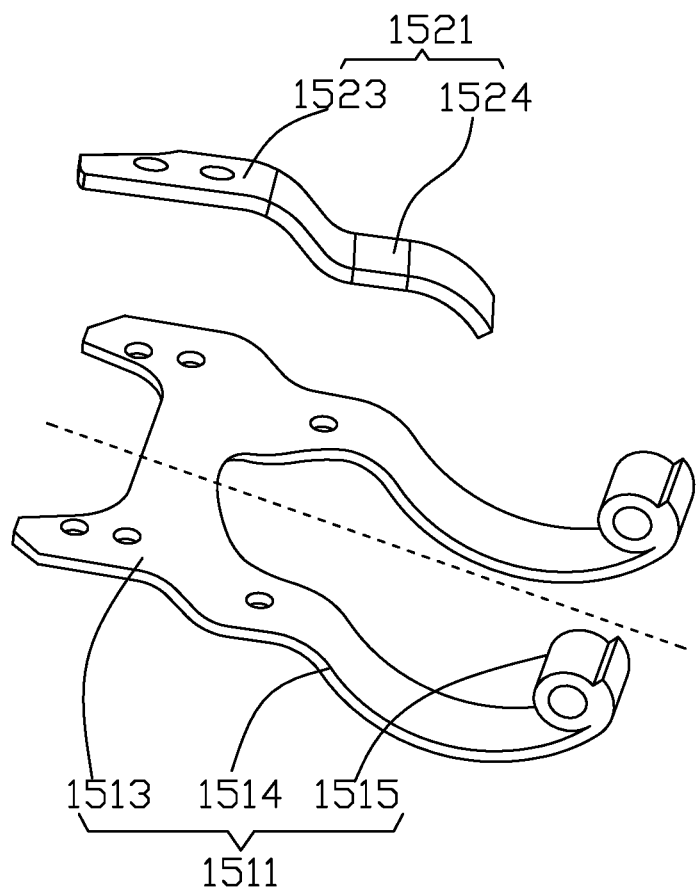
FIG. 6B is a schematic structural exploded diagram of the vibration damper of the scooter according to the present disclosure.

Referring to FIG. 6B, the first vibration damping member 1511 includes a first fixed section 1513, a first vibration damping section 1514 and a first connecting section 1515 that are fixedly connected. The first fixed section 1513 is connected to the frame assembly 14. The first connecting section 1515 is connected to the rear wheel assembly 16. The first buffering member 1521 includes a first positioning structure 1523 and a first buffering structure 1524 that are fixedly connected. The first positioning structure 1523 is connected to the frame assembly 14. The end of the first buffering structure 1524 away from the frame assembly 14 is a free end.

Figure 6C:
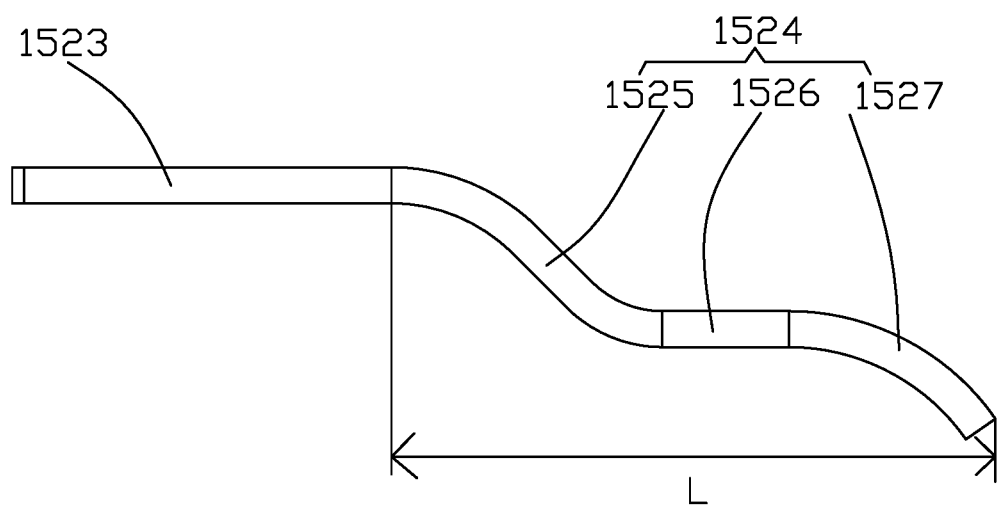
FIG. 6C is a schematic structural plan diagram of a first buffering member of the scooter according to the present disclosure from a perspective.

Referring to FIG. 6C, the first buffering structure 1524 includes a first transition section 1525, a first buffering section 1526, and a second transition section 1527 which are smoothly connected in sequence. The first transition section 1525 and the first fixed section 1513 are fixed in position relative to each other.

Referring to FIG. 6A and FIG. 6C together, the maximum thickness d of the vibration damper 15 is 4-20 mm. The thickness d1 of the vibration damping device 151 is 2-13 mm, preferably d1 is 3-10 mm. The thickness d2 of the buffering device 152 is 2-13 mm, preferably d2 is 1-10 mm. Preferably, d1: d2=0.8-1.2. The length of the first buffering structure 1524 is L, namely, the shortest distance from one end of the first buffering structure 1524 to the other end thereof in the direction from the first positioning structure 1523 to the first buffering structure 1524. The actual shortest extension length of the first buffering structure 1524 is S, namely, the unfolded length of the first buffering structure 1524 in the direction from the first positioning structure 1523 to the first buffering structure 1524. The ratio of L to S is 1:(1.21-1.48), preferably L: S is 1:(1.25-1.45), and in relation thereto, L is preferably 30-120 mm.

Figure 6D:
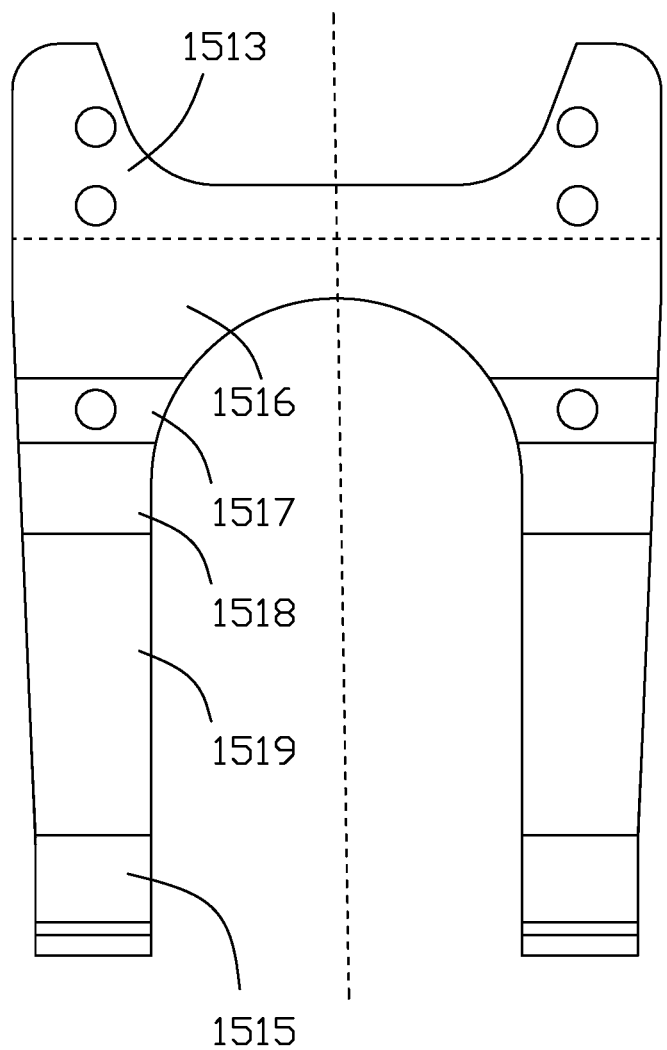
FIG. 6D is a schematic structural plan diagram of a vibration damping device of the scooter according to the present disclosure from a perspective.

Referring to FIG. 6D, the first vibration damping section 1514 includes a first transition portion 1516, a first buffering portion 1517, a second transition section 1518, a first vibration damping portion 1519 that are smoothly and fixedly connected in sequence. The first transition portion 1516 and the first fixed section 1513 are smoothly connected. The arrangement of the first buffering portion 1517 can avoid the first vibration damping member 1511 being damaged due to stress concentration caused by the first fixed section 1513 being directly connected to the first vibration damping section 1514.

Referring to FIGS. 6E-6H together, the first transition portion 1516 and the first transition section 1525 are preferably wave-shaped. The tangent angle B1 formed by the tangent line of the first transition portion 1516 and the horizontal line in a direction is 0-55°, preferably B1 0-48°. The tangent angle B2 formed by the tangent line of the first transition section 1525 and the horizontal line in a direction is 0-55°, preferably B2 0-48°. The second transition section 1518 and the second transition section 1527 are preferably arc-shaped. The tangent angle B3 formed by the tangent line of the second transition section 1518 and the horizontal line in a direction is 0-50°, preferably B3 0-43°. The tangent angle B4 formed by the tangent line of the second transition section 1527 and the horizontal line in a direction is 0-50°, preferably B4 0-43°. The first buffering portion 1517 and the first buffering section 1526 are both planar structures. It can be understood that, in the present disclosure, since the first buffering structure 1524 and the first vibration damping section 1514 are completely fitted, the first transition section 1516 corresponds to the first transition section 1525, the first buffering portion 1517 corresponds to the first buffering section 1526, and at least a part of the second transition section 1518 corresponds to and completely fits with the second transition section 1527. Preferably, the area where the first buffering structure 1524 and the first vibration damping section 1514 are fitted is 9-20 cm$^2$, and further preferably 10-15 cm$^2$.

The first transition section 1525 may be arc-shaped. The second transition section 1527 may be waved, including but not limited to this, provided that the first transition section 1525 and the first transition portion 1516, the second transition section 1527 and the second transition section 1518 are completely fitted.

Figure 6I:
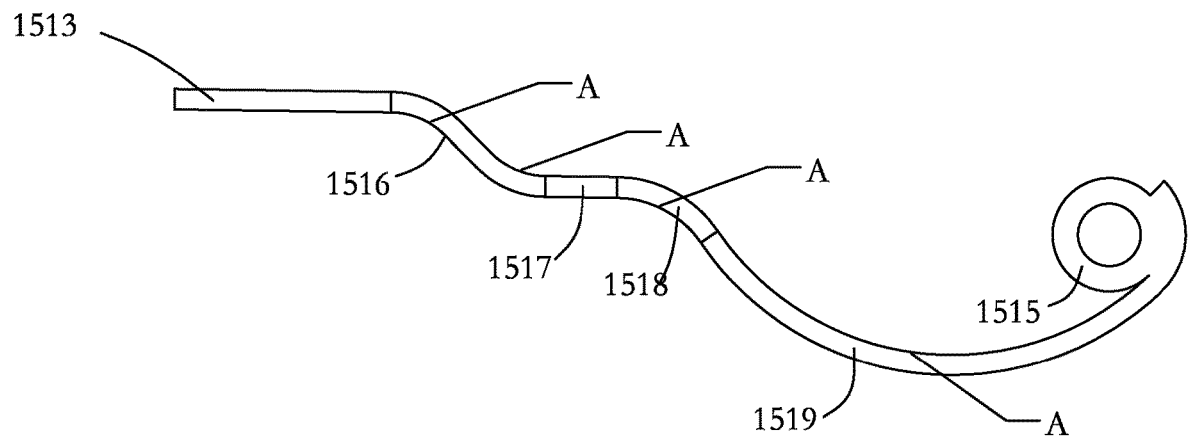
FIG. 6I is another schematic structural plan diagram of a vibration damping device of the scooter according to the present disclosure.
Figure 6J:
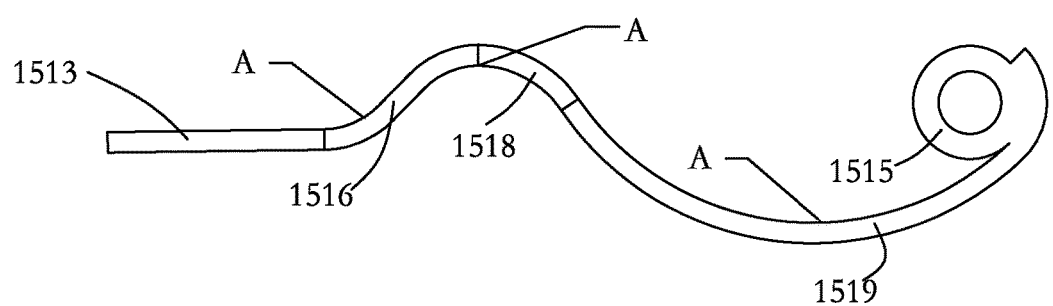
FIG. 6J is a schematic diagram of a variant structure of the vibration damping device of the scooter according to the present disclosure.

The first vibration damping section 1514 is formed with at least three arched protrusions A, and FIG. 6J shows three arched protrusions A (correspondingly, at this time, the first buffering section 1526 and the first buffering portion 1517 are omitted). FIG. 6I shows four arched protrusions A, and the opening directions of two adjacent arched protrusions A are different. The opening directions are defined as two directions, one is a horizontal upward direction, and the other is a horizontal downward direction. The disclosure preferably provides four arched protrusions A, and the opening direction of the first arched protrusion A generated by the first fixed section 1513 and the first transition portion 1516 is preferably horizontally downward. Preferably, the first vibration damping section 1514 is formed with at least 3-6 arched protrusions 1283, preferably 3, 4 or 5.

The first buffering structure 1524 is at least partially fitted to one of the arched protrusions 1283. In this way, when the first vibration damping section 1514 is deformed, the first buffering structure 1524 can prevent the first vibration damping section 1514 from continuing to deform to a certain extent, so as to reduce the risk of breakage of the first vibration damping member 1511. Preferably, the first buffering structure 1524 is completely fitted to the first fixed section 1513 and the overlapped first vibration damping member 1511 to increase the contact area of the first buffering member 1521 and the first vibration damping member 1511 so as to improve protection for the first vibration damping section 1514. Preferably, the fitted part of the first buffering structure 1524 and the arched protrusion 1283 includes an inflection point of the arched protrusion 1283.

It can be understood that, in some embodiments, the vibration damper 15 may be disposed on the front wheel assembly 13 to attenuate the vibration generated by the front wheel assembly 13 during travel.

Referring to FIG. 6G, as an embodiment, the third tubular member 123 includes a wiring groove 1232 and a cover plate 1233. One end of the wiring groove 1233 is fixedly connected with the second tubular member 122 along the second opening 125. One end of the cover plate 1233 is detachably adjacent to a connection portion of the wiring groove 1232 and the second tubular member 122, and the other end of the cover plate 1233 may be turned over relative to the wiring groove 1232. By such a structure, particular during assembly of the scooter, by turning over the cover plate 1233, it is convenient for the wires of the scooter to pass through the first tubular member 121, the second tubular member 122 and the second tubular member 123, thereby achieving the purposes that the wires of the scooter are smoothly guided and the wires of the scooter are accommodated in the tubular members.

Specifically, the shape of a groove mouth of the wiring groove 1232 matches the shape of the cover plate 1233.

Specifically, the third tubular member 123 and the second tubular member 122 are formed integrally.

Figure 7:
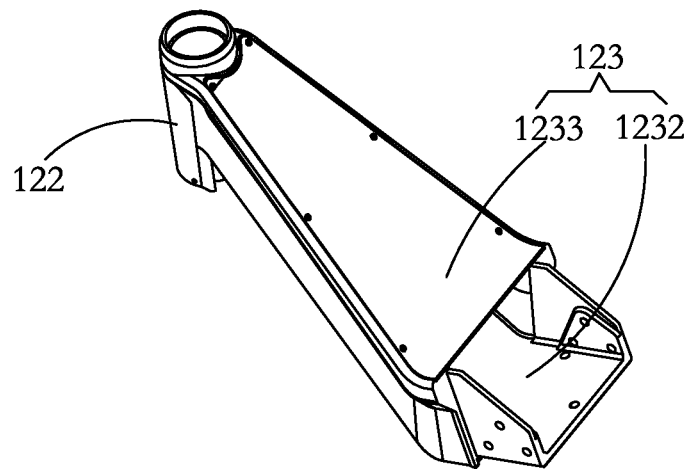
FIG. 7 is a schematic diagram of the third tubular member of the scooter according to the present disclosure.
Figure 8:
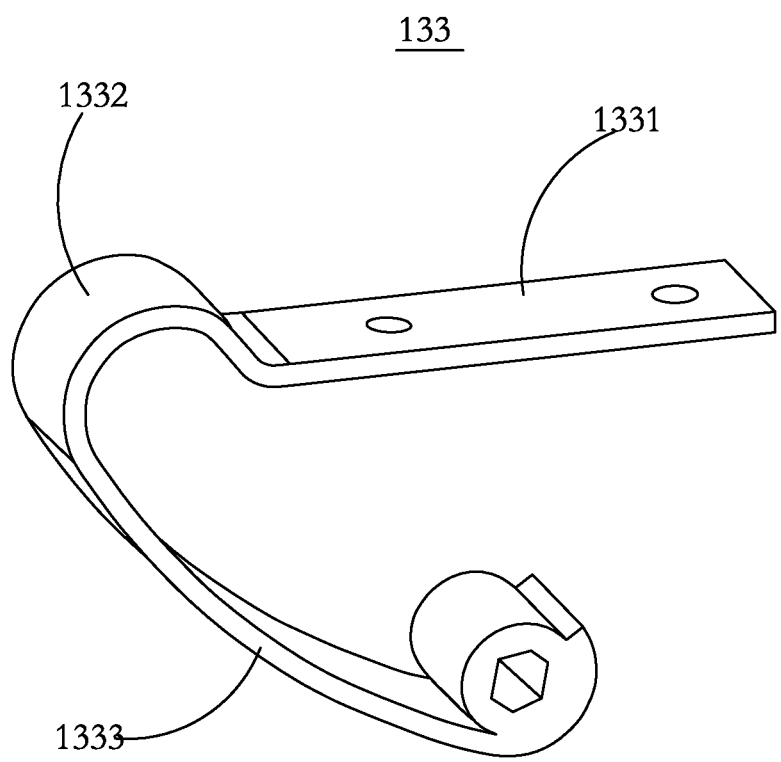
FIG. 8 is a schematic diagram of a vibration damping assembly of the scooter according to the present disclosure.

Referring to FIG. 7, Referring to FIG. 7, the front wheel assembly 13 includes the vibration damping assembly 133. The vibration damping assembly 133 is disposed between the front fork 132 and the front wheel set 131. The vibration damping assembly 133 includes a first vibration damping sheet 1331, a second vibration damping sheet 1333 and a stress sheet 1332. The first vibration damping sheet 1331 is connected to the front fork 132. The second vibration damping sheet 1333 is connected to the front wheel set 131. The stress sheet 1332 is disposed between the first vibration damping sheet 1331 and the second vibration damping sheet 1333 so as to eliminate stress concentration between the first vibration damping sheet 1331 and the second vibration damping sheet 1333 due to deformation. Thus, the service life of the vibration damping assembly 133 can be effectively prolonged while the vibration of the scooter is attenuated.

The above description is merely preferred embodiments of the present disclosure, and is not intended to limit the present disclosure. Any modification, equivalent replacement, and improvement made within the principle of the present disclosure shall fall within the protection scope of the present disclosure.

The invention claimed is:

1. A scooter, characterized in that, the scooter comprises a handle assembly, a frame assembly, a front wheel assembly and a wiring structure, wherein the wiring structure is fixedly connected to the handle assembly, the frame assembly, and the front wheel assembly, respectively;

the wiring structure comprises a first tubular member, a second tubular member, and a third tubular member, wherein the second tubular member sleeves a periphery of the first tubular member and an axis of the first tubular member coincides with an axis of the second tubular member; a first opening and a second opening are respectively provided on the first tubular member and the second tubular member, and the first opening is opposite to the second opening; one end of the third tubular member is fixedly connected to the second tubular member along the second opening; and when the first tubular member is rotated relative to the second tubular member, there is a gap between the first opening and the second opening.

2. The scooter according to claim 1, characterized in that, the gas is 5-20 mm.

3. The scooter according to claim 1, characterized in that, the wiring structure further comprises a first blocking member and a second blocking member, wherein the first blocking member is fixedly provided on the first tubular member, the second blocking member is fixedly provided on the second tubular member, and when the first tubular member is rotated relative to the second tubular member, the first blocking member and the second blocking member are mutually restrained to limit a rotation angle of the first tubular member relative to the second tubular member.

4. The scooter according to claim 3, characterized in that, the rotation angle of the first tubular member relative to the second tubular member is A, and the angle A is 90-135°.

5. The scooter according to claim 1, characterized in that, the other end of the third tubular member is fixedly connected to the frame assembly; the size of the first opening is less than, or greater than or equal to the size of the second opening; when the size of the first opening is less than the size of the second opening, the third tubular member comprises an adjoining rib and a connecting rib; the third tubular member is formed by connecting the connecting rib with the adjoining rib and is formed with a third opening; the size of the third opening is greater than or equal to the size of the second opening; the connecting rib and the adjoining rib are fixedly connected in an axial direction of the third tubular member; and the connecting rib and/or the adjoining rib are/is fixedly connected with the second tubular member.

6. The scooter according to claim 3, characterized in that, the first blocking member is a limiting protrusion, the limiting protrusion comprises a fixed ring and a protrusion which is fixedly connected to an outer rim of the fixed ring, and the fixed ring sleeves and is fixed to the first tubular member; a notch is provided on the second tubular member, and the second blocking member is limiting stoppers provided at two ends of the notch in the radial direction of the first tubular member; and the protrusion is located between the notch and the limiting stopper, and when the first tubular member is rotated relative to the second tubular member, the protrusion is blocked by the limiting stopper to limit the rotation angle of the first tubular member relative to the second tubular member.

7. The scooter according to claim 1, characterized in that, the first opening has a diameter of 10-20 mm and the second opening has a diameter of 10-20 mm.

8. The scooter according to claim 1, characterized in that, the third tubular member and the second tubular member are formed integrally; the third tubular member comprises a wiring groove and a cover plate; one end of the wiring groove is fixedly connected with the second tubular member along the second opening; and one end of the cover plate is detachably adjacent to a connection portion of the wiring groove and the second tubular member, and the other end thereof can be turned over relative to the wiring groove.

9. The scooter according to claim 1, characterized in that, the wiring structure further comprises two bearings, the two bearings are provided at two ends of the second tubular member, the bearing comprises an inner ring and an outer ring, the first tubular member is fixedly connected to the inner ring, the second tubular member is fixedly connected to the outer ring, and the first tubular member can be rotated relative to the second tubular member through the bearings.

10. The scooter according to claim 5, characterized in that, the number of each of the connecting ribs and the adjoining ribs is two; the connecting ribs and the adjoining ribs are alternately and sequentially connected to form the third tubular member; a distance between the two connecting ribs is k; the maximum width of the second opening is n, where n: k=(1.1-1.5); and the straight line defined between the two connecting ribs is parallel to the straight line defined at the maximum width of the second opening.

11. The scooter according to claim 1, characterized in that, in a radial section of the second tubular member corresponding to the first opening, the edge and the circle center of the second opening form a second sector region, the edge and the circle center of the first opening form a first sector region, and the first sector region is able to rotate only within the second sector region; the radial section is a plane perpendicular to the axis of the first tubular member or the second tubular member and passing through both the first opening and the second opening; and two intersection points of a plane of the first opening or the second opening and the edge of the first opening are two first intersections, two intersection points of the plane and the edge of the second opening are two second intersections, the circle center and the two first intersections form the second sector region, and the circle center and the two second intersections form the first sector region.

12. The scooter according to claim 1, characterized in that, the scooter further comprises a vibration damper, one end of the vibration damper is connected to the frame assembly of the scooter and the other end thereof is connected to a front wheel assembly of the scooter; the vibration damper comprises a buffering device and a vibration damping device which are overlapped; the buffering device comprises a first buffering member; the first buffering member comprises a first positioning structure and a first buffering structure that are fixedly connected, and the first positioning structure is connected to a frame; the vibration damping device comprises a first vibration damping member; the first vibration damping member comprises a first fixed section, a first vibration damping section and a first connecting section that are fixedly connected; the first fixed section is connected to the frame; the first connecting section is connected to the wheel assembly; the first vibration damping section comprises at least three arched protrusions; and the first buffering structure is at least partially fitted to one of the arched protrusions.

13. The scooter according to claim 12, characterized in that, the first buffering structure comprises a first transition section, a first buffering section, and a second transition section which are in smooth transition connection with one another in sequence; the first transition section is fixedly connected to the first fixed section; the tangent angle formed by the tangent line of the first transition portion and the horizontal line in a direction is 0-48°; and the tangent angle formed by the tangent line of the second transition section and the horizontal line in a direction is 0-43°.

14. The scooter according to claim 13, characterized in that, the first transition portion and the second transition section are wave-shaped or arc-shaped.

15. The scooter according to claim 1, characterized in that, the scooter further comprises a rear wheel assembly; the front wheel assembly comprises a vibration damping device, a front fork and a front wheel set; the vibration damping device is disposed between the front fork and the front wheel set; the vibration damping device comprises a first vibration damping sheet, a second vibration damping sheet and a stress sheet; the stress sheet is disposed in an arc shape between the first vibration damping sheet and the second vibration damping sheet to connect the first vibration damping sheet and the second vibration damping sheet; there is a gap between an end, away from the stress sheet, of the second vibration damping sheet and an end, away from the stress sheet, of the first vibration damping sheet, so that an opening is formed between the first vibration damping sheet and the second vibration damping sheet; and after the vibration damping device is mounted between the front wheel set and the front fork, the opening faces away from or towards the rear wheel assembly.

\* \* \* \* \*